(12) United States Patent
Takaki et al.

(10) Patent No.: US 9,192,169 B2
(45) Date of Patent: Nov. 24, 2015

(54) EASY-TO-CHEW/SWALLOW FOODS, AND FOOD MAKING METHOD

(75) Inventors: Seiichi Takaki, Hiroshima (JP);
Megumi Shobayashi, Hiroshima (JP);
Hitoshi Fukui, Hiroshima (JP)

(73) Assignee: ANDERSON INSTITUTE OF BREAD & LIFE. CO., LTD., Hiroshima (JP)

( * ) Notice: Subject to any disclaimer, the term of this patent is extended or adjusted under 35 U.S.C. 154(b) by 44 days.

(21) Appl. No.: 13/062,354

(22) PCT Filed: May 10, 2010

(86) PCT No.: PCT/JP2010/003168
§ 371 (c)(1),
(2), (4) Date: May 31, 2011

(87) PCT Pub. No.: WO2011/141951
PCT Pub. Date: Nov. 17, 2011

(65) Prior Publication Data
US 2011/0274810 A1    Nov. 10, 2011

(51) Int. Cl.
*A21D 13/00* (2006.01)
*A21D 15/02* (2006.01)
*A21D 15/04* (2006.01)
*A21D 17/00* (2006.01)

(52) U.S. Cl.
CPC ............ *A21D 15/02* (2013.01); *A21D 13/0067* (2013.01); *A21D 15/04* (2013.01); *A21D 17/006* (2013.01)

(58) Field of Classification Search
USPC .......................................... 426/549, 553, 800
See application file for complete search history.

(56) References Cited

U.S. PATENT DOCUMENTS

| | | | | |
|---|---|---|---|---|
| 3,531,300 | A | * | 9/1970 | Greenberg et al. ............ 426/232 |
| 5,846,585 | A | * | 12/1998 | Ohmura et al. ................ 426/241 |
| 6,365,213 | B1 | * | 4/2002 | Taheri ............................ 426/302 |
| 2003/0228408 | A1 | * | 12/2003 | Meister ......................... 426/618 |

FOREIGN PATENT DOCUMENTS

| | | |
|---|---|---|
| JP | 11-75769 | 3/1999 |
| JP | 2000-83617 | 3/2000 |
| JP | 2000-191553 | 7/2000 |
| JP | 2004-350680 | 12/2004 |
| JP | 2006-304642 | 11/2006 |

(Continued)

OTHER PUBLICATIONS

English-language machine translation of JP-2006-304692 A provided by Patent & Utility Model Gazette DB, JPO.*

(Continued)

*Primary Examiner* — Lien T Tran
(74) *Attorney, Agent, or Firm* — Wenderoth, Lind & Ponack, L.L.P.

(57) ABSTRACT

A food item includes a bread product made from a dough containing flour and water, the water being in an amount no greater than 140 parts by mass per 100 parts by mass of flour. The dough is swollen using a swelling agent and heated to form the bread product. The bread product has a crust part, and is impregnated uniformly with a liquid or gel composition by being dipped in 50 to 200 parts by mass of the liquid or gel composition. The bread product has a hardness not greater than $5 \times 10^4$ N/m² even in the crust part.

1 Claim, 4 Drawing Sheets

(56) References Cited

FOREIGN PATENT DOCUMENTS

| JP | 2006-304693 | | 11/2006 |
|----|----|----|----|
| JP | 2006304692 A | * | 11/2006 |
| JP | 2008-29208 | | 2/2008 |
| JP | 2008-141994 | | 6/2008 |
| WO | 99/08545 | | 2/1999 |
| WO | WO 99/08545 | * | 2/1999 |
| WO | 03/055334 | | 7/2003 |

OTHER PUBLICATIONS

International Search Report issued Jul. 26, 2010 in International Application No. PCT/JP2010/003168.

Isuzu Egami, "Development of Bread with Consideration of Nutritional and Physical Properties for Elderly", Journal of Nagoya Bunri University, Mar. 2010, No. 10, pp. 109 to 114 (particularly table 3).

Sadako Takasaki, "Shokupan Oyobi Pangayu no Bussei Kaiseki", The Japan Society of Cookery Science Heisei 20 Nendo Taikai, 2008, p. 61 (lecture No. 1P-21).

Mineka Yoshikawa et al., "Yo Kaigo Koreisha ni Tabeyasui Pan no Shin Kaihatsu", The Japanese Society of Dysphagia Rehabilitation, 2009, vol. 13, No. 3, pp. 313 to 314 (lecture No. I-6-1).

Mineka Yoshikawa et al., "Yo Kaigo Koreisha no Tameno Isoshakusei Pan no Shin Kaihatsu", Dai 20 Kai Japan Society for Mastication Science and Health Promotion Shoroku, 2009, vol. 19, No. 2, pp. 91 to 92.

* cited by examiner

EASY-TO-CHEW/SWALLOW FOODS, AND FOOD MAKING METHOD

BACKGROUND OF THE INVENTION

1. Field of the Invention

The present invention relates to a food that can be chewed and swallowed with safety and ease, while remaining its original form (for instance, bread form), by even those who have difficulty chewing and swallowing down foods, especially the aged, those who are suffering from diseases, recuperating or getting better, and having aftereffects of diseases, and babies in the weaning period, and a food making method.

2. Description of the Prior Art

In order for those who have difficulty chewing and swallowing down foods to have a meal and drink with great safety, there have so far been methods provided for adding a gelling agent to foods having more water than conventional ones do, tee or other drink of higher fluidity to provide moderate viscosity to them (for instance, see Patent Publications 1, 2 and 3). However, they have only limited applications such as sloppy food applications.

In order to allow those who have difficulty chewing and swallowing down foods to have a meal and drink with great safety, there has also been a method of processing foods by chopping, mincing, mashing or like. However, the ensuing foodstuff is aesthetically awful, getting rid of the pleasure of eating and eliciting lack of appetite and poor quality of life.

With such situations in mind, there is now the development of foods that add up to the pleasure of eating by grounding and then reforming foods, although they can be safely and easily swallowed down (for instance, see Patent Publications 4 and 5).

In spite of the fact that the aged having preference for breads are growing in number through the westernization of eating, breads are found to have a high risk of aspiration and choking; so they are now considered to be dangerous foods for the aged or those who have difficulty chewing and swallowing down foods.

Referring to breads suitable for those who have difficulty chewing and swallowing down foods, there is the development of crispier, less sticky, softer bread (for instance, see Patent Publications 6 and 7).

However, such bread would appear not to work well, because of an increased load on those who have their chewing and swallowing capability going down to the degree of chopped or mashed foods, and also because of a risk of aspiration.

There is also a method provided of making pap so as to safely serve bread for those who have difficulty chewing and swallowing down foods; however, it does not remain its original form, getting rid of the pleasure of eating bread.

LISTING OF THE PATENT PUBLICATIONS

Patent Publication 1: JP(A) 2000-083617
Patent Publication 2: JP(A) 2000-191553
Patent Publication 3: JP(A) 2004-350680
Patent Publication 4: JP(A) 11-075769
Patent Publication 5: JP(A) 2008-141994
Patent Publication 6: JP(A) 2006-304692
Patent Publication 7: JP(A) 2006-304693

SUMMARY OF THE INVENTION

Object of the Invention

Having been made to address the aforementioned problems with the prior art, the present invention has for its object to provide foods that can be safely and easily chewed, while remaining its original form (for instance, bread form), by even those who have difficulty chewing and swallowing down foods, especially the aged, those who are suffering from diseases, recuperating or getting better, and having aftereffects of diseases, and babies in the weaning period, and a food making method.

According to a preferable embodiment of the invention, there is a food provided which comprises a dough containing water in an amount of no greater than 140 parts by mass per 100 parts by mass of flour, characterized in that said dough is swollen using a swelling agent and heated into a foodstuff, and 100 parts by mass of said foodstuff are dipped in 50 to 200 parts by mass of a liquid or gel-like composition such that said liquid or gel-like composition impregnates uniformly through said foodstuff to a hardness of not greater than $5\times10^4$ $N/m^2$, said food being packed in a chilling or freezable manner.

According to another preferable embodiment of the invention, there is a diet provided which comprises a dough containing water in an amount of no greater than 140 parts by mass per 100 parts by mass of flour, characterized in that said dough is swollen using a swelling agent and heated into a foodstuff, and 100 parts by mass of said foodstuff are dipped in 50 to 200 parts by mass of a liquid or gel-like composition such that said liquid or gel-like composition impregnates uniformly through said foodstuff to a hardness of not greater than $5\times10^4$ $N/m^2$, said food being packed in a chilling or freezable manner, and after dechilling or thawing, said food being reheated and removed from within said pack with a hardness of not greater than about $5\times10^4$ $N/m^2$ before being served.

Yet another preferable embodiment of the invention is characterized in that sugars are contained in an amount of 0.5 to 55 parts by mass per 100 parts by mass of said flour.

A further preferable embodiment of the invention is characterized in that oils and fats are contained in an amount of 0.5 to 45 parts by mass per 100 parts by mass of said flour.

A further preferable embodiment of the invention is characterized in that a viscosity-increasing stabilizer is contained in an amount of 0.01 to 5 parts by mass per 100 parts by mass of said flour.

A further preferable embodiment of the invention is characterized in that said heating is carried out with said dough placed in a mold.

A further preferable embodiment of the invention is characterized in that said packed food is sterilized by heating under pressure.

Advantages of the Invention

The inventive food and food making method have a feature of providing an easy-to-chew/swallow food, while remaining its original basic form (for instance, bread form), even on those who have difficulty chewing and swallowing down foods, especially the aged, those who are suffering from diseases, recuperating or getting better, and having aftereffects of diseases, and babies in the weaning period.

DETAILED DESCRIPTION OF THE PREFERRED EMBODIMENTS

Figure 1:
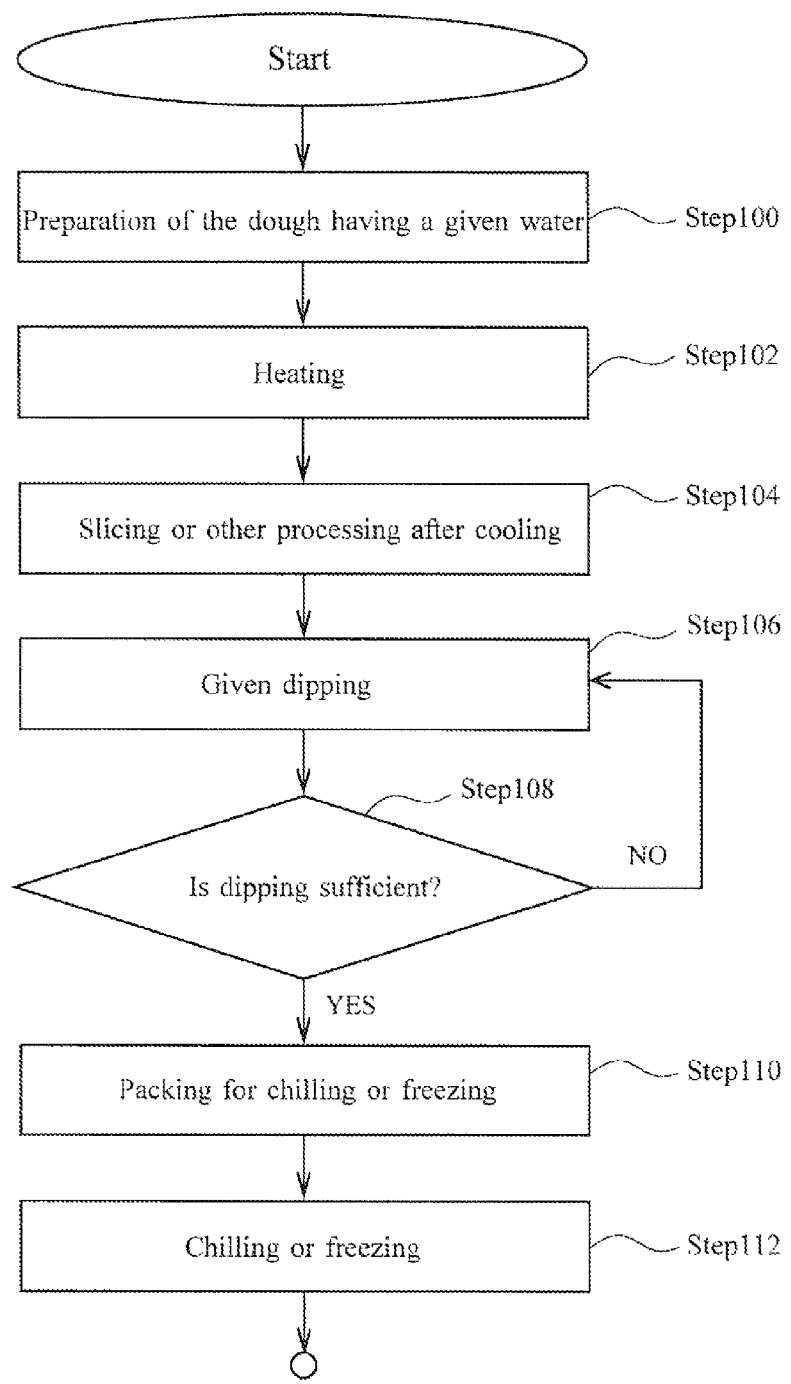
FIG. 1 is a flowchart illustrative of the inventive food making method.

Reference is now made to the dough used for the inventive food for those who have difficulty chewing and swallowing down foods, and the inventive food making method.

The bread dough used herein contains, for instance, 40 to 140 parts by mass of water per 100 parts by mass of flour, and further contains one or two of yeast and a swelling agent such as baking powder and baking soda.

By way of example only, and not as limitations, the "flour(s)" used herein is understood to embrace wheat flours (cake flour, medium-strength flour, quasi-strong flour, strong flour), wheat germ flour, whole wheat flour, wheat bran, *durum* flour, barley flour, rye flour, whole rye flour, soybean flour, and starches (corn starch, potato starch, tapioca starch, processed starch, etc.).

One or more flours selected from these may be used, and commercially available bread premixes may be used for the aforementioned flour as well.

As already mentioned, the amount of water is 40 to 140 parts by mass per 100 parts by mass of flour; however, it is preferable that the amount of water is 60 to 110 parts by mass per 100 parts by mass of flour.

The reason is that the water amount of greater than 140 parts by mass in particular would cause bread products to come too vigorously off an oven, failing to obtain physical hardness suitable for the easy-to-chew/swallow food.

In some possible applications, the aforementioned dough may have sloppy liquid component such as milk, whole eggs and liquid sugars added to it. In such cases, the parts by mass of fresh water should preferably be adjusted while taking their water content into account.

For the swelling agent, it is then preferable to use one or more of yeast and swelling agents such as baking powder and baking soda.

On the premise that the dough is fully swollen, no specific limitation is placed on the swelling agent used and on how much it is used. However, it is noted that when only yeast is used, it should preferably be used in an amount of 0.5 to 6 parts by mass per 100 parts by mass of flour.

By way of example only, and not as limitations, the sugars used herein include glucose, fruit sugar, sucrose, maltose, enzyme-saccharified malt syrup, milk sugar, reducing starch saccharified products, isomerized liquid sugar, sucrose-bound malt syrup, oligosaccharides, reducing sugar polydextrose, sorbitol, reducing milk sugar, trehalose, xylose, xylitol, maltitol, erythritol, mannitol, fluctoligosaccharides, soybean oligosaccharides, galuctoligosaccharides, lactic oligosaccharides, raffinose, lacturose, and palatinose oligosaccharides.

One or more sugars selected from these may be used with the dough used herein.

It is here to be noted that for those sugars, use may be made of sweetened condensed milk, jam, fruit juice, fruit sauce, chocolate paste or the like that are used in food form that contains sugars and can be mixed uniformly with the dough.

In the dough used herein, the amount of the sugars is 0.5 to 55 parts by mass, preferably 2 to 35 parts by mass per 100 parts by mass of the flour. An amount of less than 0.5 parts by mass makes post-heating foods physically harder, resulting in the incapability of obtaining physical hardness suitable for the easy-to-chew/swallow food. It is to be noted that when the foodstuff containing sugars is used, the total content of sugars should be figured out on the basis of the amount of pure sugars contained in it.

By way of example only, and not as limitations, the oil and fat combination include a variety of vegetable and animal oils and fats such as palm oil, palm kernel oil, coconut oil, corn oil, soybean oil, cottonseed oil, soybean oil, rice oil, rapeseed oil, sunflower oil, safflower oil, cacao fat, sal fat, beef tallow, lard, milk fat, fish oil and whale oil as well as processed oils and fats obtained from them through one or more processing selected from hydrogenation, fraction and ester exchange and MCT (medium-chain fatty acid triglycerides). One or more oils and fats selected from them may be used together with the dough used herein.

The oil and fat combination is used usually in food form containing oils and fats, and a typical example of it is an oil-and-fat composition such as margarine, shortening, butter, powder oils and fats, and liquid oils and fats. Besides, use may be made of foodstuff that containing oils and fats mixable uniformly with dough such as fresh cream, whipping cream (compound cream), vegetable whipping cream, cream cheese, and chocolate paste.

In the dough used herein, the oil and fat combination is contained in an amount of 0.5 to 45 parts by mass, preferably 2 to 35 parts by mass per 100 parts by mass of flour. An amount of less than 0.5 parts by mass would make post-heating foods physically harder, resulting in the inability to obtain physical hardness suitable for the easy-to-chew/swallow food. An amount of greater than 45 parts by mass, on the other hand, would make the internal texture of post-heating foods mushy, resulting in the inability to obtain physical hardness suitable for the easy-to-chew/swallow food.

It is to be noted that when the oil and fat combination is used in food form containing a combined oil and fat, the total oil and fat content should be figured out on the basis of pure oils and fats contained in it.

Preferably, the dough used herein should contain the viscosity-increasing stabilizer in an amount of 0.01 to 5 parts by mass, preferably 0.05 to 3 parts by mass per 100 parts by mass of flour. At less than 0.01 part by mass, there would an obstacle to the uniform formation of air bubbles, and physically moderate hardness would be lost, resulting in the inability to obtain physical hardness suitable for diets easy to masticate and swallow.

By way of example only, and not as limitations, the viscosity-increasing stabilizer includes those used so far with foods, preferably, gelatin, broken-down gelatin, alginic acid, alginates, ammonium alginate, potassium alginate, calcium alginate, sodium alginate, LM pectin, algae extracts, agar, glucomannan, methyl cellulose, hydroxypropyl cellulose, locust bean gum, guar gum and xanthane gum, which may be used alone or in combination of two or more.

There is no particular limitation on how to contain the viscosity-increasing stabilizer in the dough; a proper choice may be made from among the method of mixing the viscosity-increasing stabilizer in powdery form with the aforementioned flour, sugars, oils and fats, etc. for direct use, the method of using a solution in water of the viscosity-increasing stabilizer, or the like.

Besides, the aforementioned dough may contain other components usable for ordinary bread dough without restrictions. For instance, there is the mention of eggs such as whole eggs, egg yellows, egg whites and dried egg whites, sweeteners, coloring agents, antioxidants, dextrin, milk or milk products such as casein, whey, cream, skim milk powder, fermented milk, milk, whole milk powder, yogurt, evaporated milk, whole fat condensed milk, skim condensed milk and condensed milk, cheeses such as natural cheese, processed cheese, Gouda cheese and Cheddar cheese, alcohols, emulsifying agents such as glycerin fatty acid esters, glycerin acetic fatty acid esters, glycerin lactic fatty acid esters, glycerin succinic fatty acid esters, glycerin diacetyl tartaric fatty acid esters, sorbitan fatty acid esters, sucrose fatty acid esters, sucrose acetic isobutyric acid esters, polyglycerin fatty acid esters, polyglycerin condensed ricinoleic acid esters, propylene glycol fatty acid esters, calcium stearoyl lactate, sodium stearoyl lactate, polyoxyethylene sorbitan monoglyceride, egg yellow lecithin and soybean lecithin, organic salts, salt, yeast foods, dough improvers, cacao and cacao products such as chocolate chips, coffee and coffee products, herbs, beans, vegetable proteins such as wheat protein and soybean protein, preservatives, bitter taste agents, acidulants, pH regulators, keepers, fruits, seasonings, spices, flavorings, foodstuffs such as vegetables, meats and fishery products, vegetable extracts and animal extracts such as clean soup and bouillon, and food additives.

The aforementioned other components may optionally be used without detrimental to the objects of the invention; however, it is preferable that in the dough, they should be used in the total amount of 100 parts by mass or less per 100 parts by mass of dough.

The inventive foods may be prepared by ordinary bread making methods, for instance, the straight method, the sponge dough method, the liquid ferment method, the extended sponge dough method, the 100% sponge dough method, the brew method, the quick method, the no-time method or the oil-in-mix method and the sugar batter method that are conventional confectionary making methods or other like methods.

When yeast is used, proofing is optionally carried out. Then, when only the swelling agent such as baking powder and baking soda is used, heating processing such as baking, high-frequency heating and steaming is then performed after dough making to obtain a bread-like foodstuff having a smooth, spongy internal texture.

Subsequently, the dough is placed and baked in a mold. Even with dough that absorbs water more than ordinary bread dough does, it is then possible to bake it into an ordinary Pullman type bread form without giving rise to problems at a slicing or other step.

Then, the foodstuff, to which the aforementioned heating processing has been applied, is sliced or otherwise processed to suitable size, if required. Then, the sliced or otherwise processed foodstuff is dipped in a liquid such as water, syrup or clear soup, or a gel-like composition such as a gelatin or agar solution in an amount of 50 to 200 parts by mass per 100 parts by mass of foodstuff so that the liquid or the composition is impregnated uniformly through the foodstuff.

Then, the foodstuff impregnated with 50 to 200 parts by mass of the liquid such as water, syrup or clear soup, or the gel-like composition such as a gelatin or agar solution is baked into an easy-to-chew/swallow food that has a physical hardness of $5 \times 10^4$ N/m$^2$ or less even at a crust site.

It is here preferable that the amount of the liquid such as water, syrup or clear soup, or the gel-like composition such as a gelatin or agar solution is 75 to 150 parts by mass. At less than 50 parts by mass, impregnation would become insufficient, resulting in the inability to obtain a physical hardness of $5 \times 10^4$ N/m$^2$ or less.

There is no particular limitation on how to carry out dipping; however, it is required to make use of a dipping method ensuring that the foodstuff is dipped in, and uniformly impregnated with, the liquid such as water, syrup or clear soup, or the gel-like composition such as a gelatin or agar solution. It is then important to take sufficient care of management and control of the dipping method and dipping time.

Referring here to how to make sure uniform dipping and impregnation of the gel-like composition such as a gelatin or agar solution in the foodstuff, the gel-like composition is presumed to decrease in viscosity as it is heated.

Such a gel-like composition is heated into a state of low viscosity. It is in that state that dipping is carried out.

The ensuing food can have a proper and appropriate viscosity at a temperature at which it is to be served as a meal, allowing even those who have difficulty chewing to create easy-to-eat lumps in the oral cavity.

It is here to be noted that with a thick gel-like composition having high viscosity, uniform dipping and impregnation would be difficult because its viscosity does not increase as it is heated.

The thus obtained food can have a physical hardness meeting the standard: "Crushable with the gum" ($5 \times 10^4$ N/m$^2$ or less) provided in Section 2 of the Self-Imposed Standard of the Japan Care Food Conference without recourse to any step such as post-heating mashing and pap making where the tissue will break down. Thus, the present invention successfully provides a food that can be chewed and swallowed down, while remaining its original form (for instance, bread form), even by those who have difficulty chewing and swallowing down foods, especially the aged, those who are suffering from diseases, recuperating or getting better, and having aftereffects of diseases, and babies in the weaning period.

If this food is packed, and sterilized by heating under pressure or chilled or frozen, it can then be stored over an extended period of time.

The process from dough making to chilling or freezing is now explained with reference to the flowchart of FIG. 1.

First of all, bread dough having a given water content is prepared (Step 100) as described above. Specifically, there is bread dough prepared that contains water in an amount of, for instance, 40 to 140 parts by mass per 100 parts by mass of flour.

As previously described, the bread dough contains yeast, sugars, oils and fats, etc. The amount of water should preferably be set at 60 to 110 parts by mass per 100 parts by mass of flour. In other words, an amount of water greater than 140 parts by mass would give rise to defects by oven spring, resulting in the inability to obtain physical hardness suitable for easy-to-chew/swallow foods.

Then, the bread dough is baked or otherwise heated (Step 102). Baking should preferably be carried out with the bread dough charged in a mold or the like.

Then, the heated foodstuff is cooled down, and sliced or otherwise divided into loafs (Step 104).

Then, the slices are dipped in the given manner (Step 106). In the inventive dipping step, it is important that the sliced or otherwise processed foodstuff is dipped in, and uniformly impregnated, with the liquid such as water, syrup or clear soup, or the gel-like composition such as a gelatin or agar solution.

If the dipping is judged to be insufficient (NO in Step 8), it is again performed, and if that is judged to be sufficient (YET in Step 108), the sliced and dipped foodstuff is packed for chilling or freezing (Step 110), and chilled or frozen (Step 112).

The food is now ready for being put on the general food market in chilled or frozen form.

Figure 2:
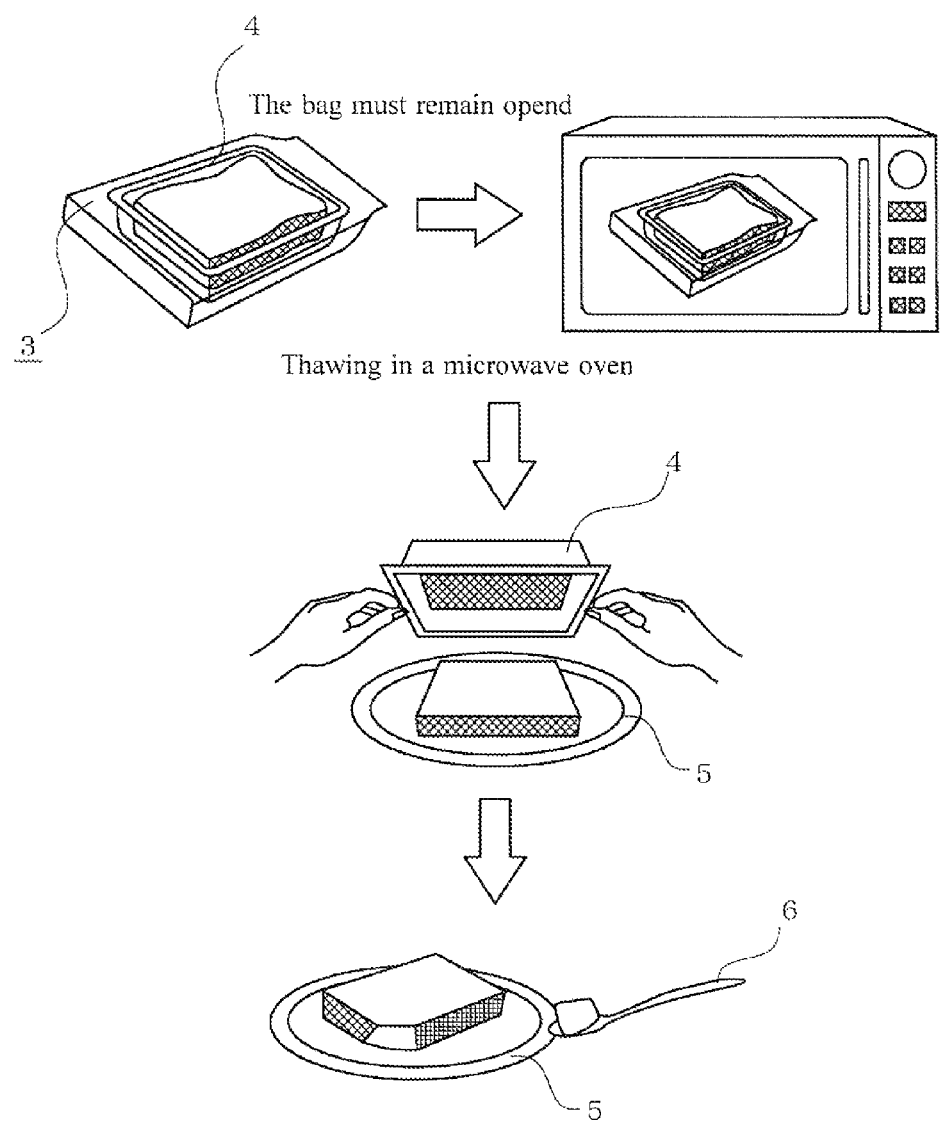
FIG. 2 is illustrative of a process from the thawing of the food frozen according to the invention to being eaten (Process 1).
Figure 3:
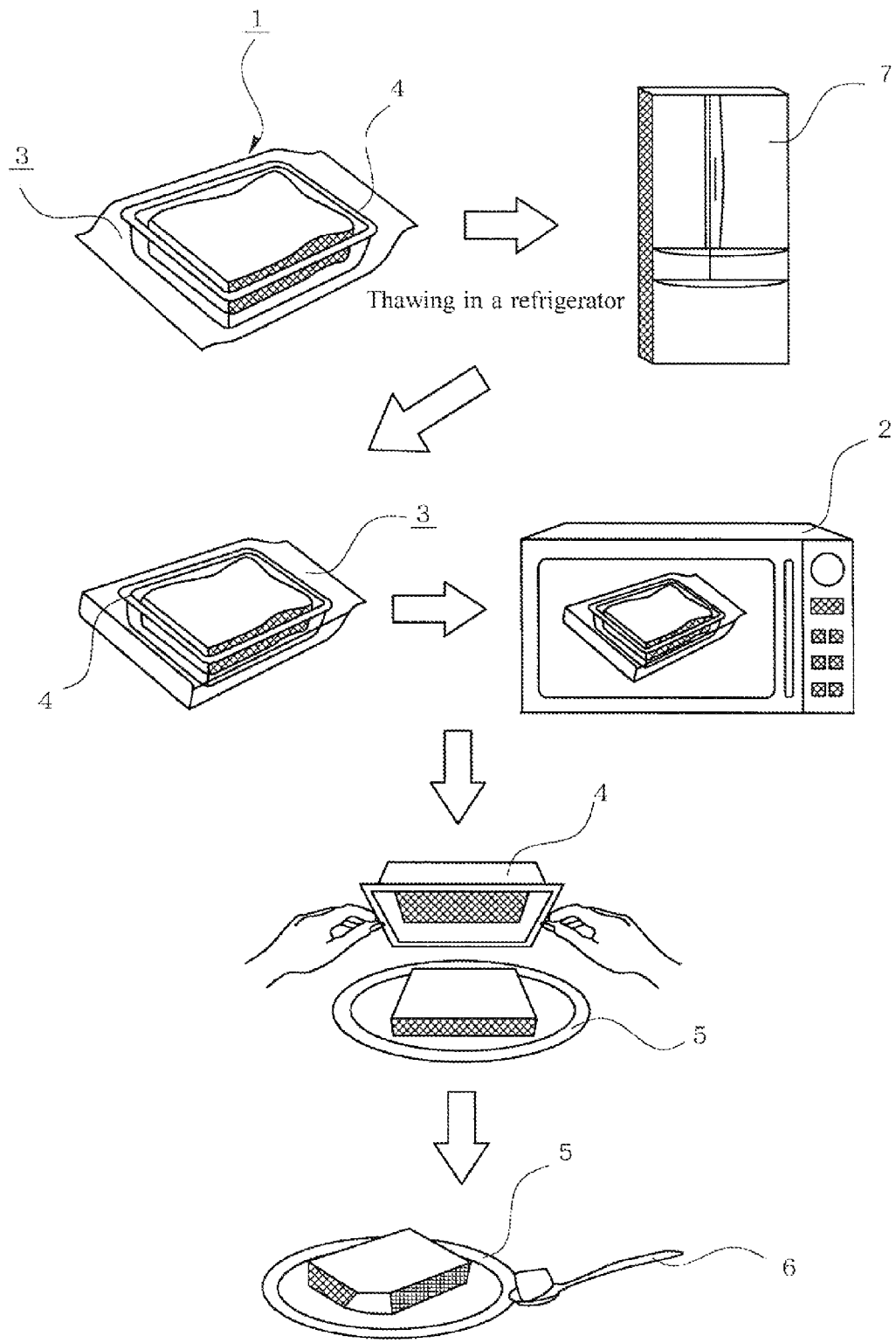
FIG. 3 is illustrative of a process from the thawing of the food frozen according to the invention to being eaten (Process 2).
Figure 4:
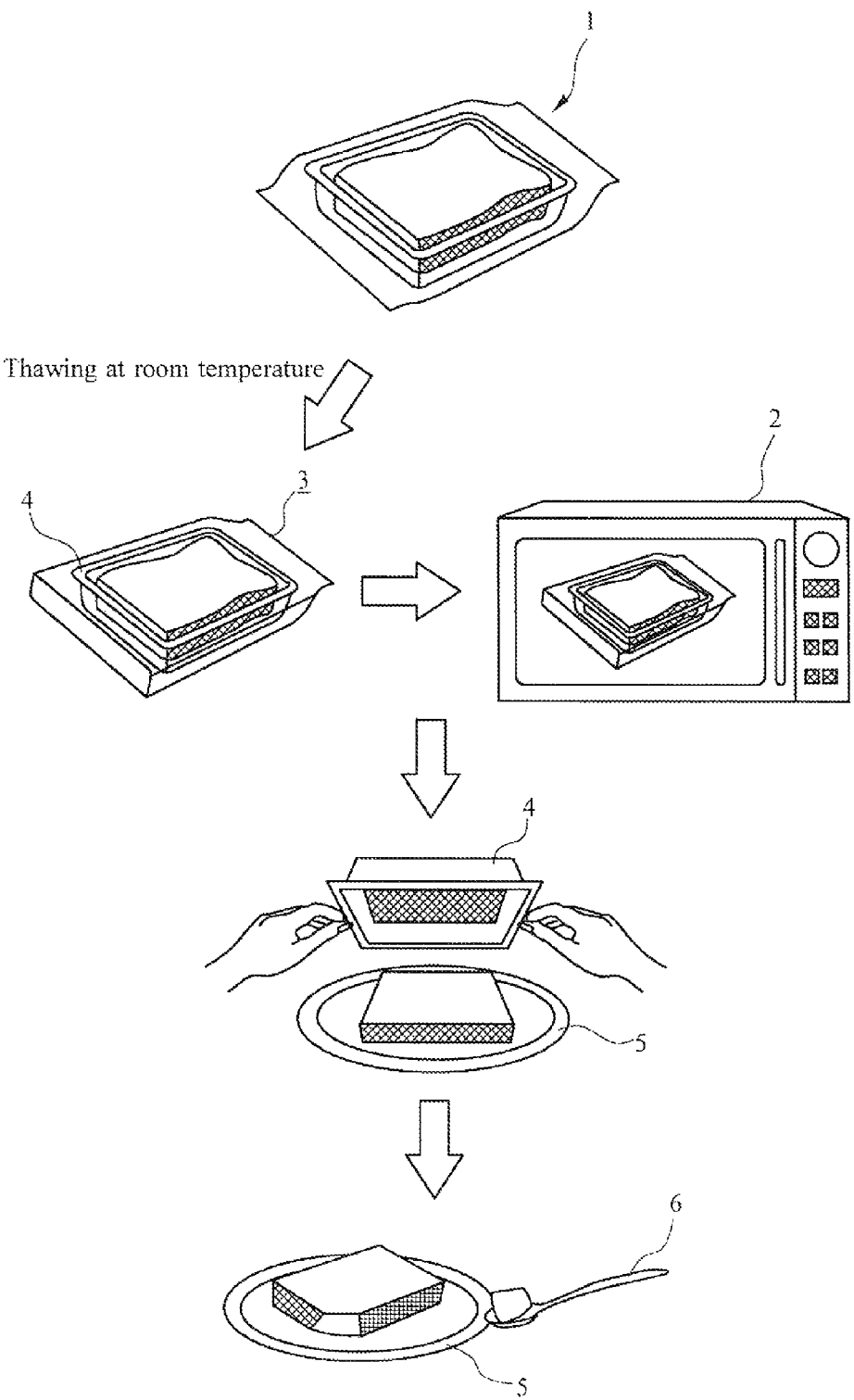
FIG. 4 is illustrative of a process from the thawing of the food frozen according to the invention to being eaten (Process 3).

The food sold in chilled or frozen form is supplied to general users as shown in the flowcharts of FIGS. 2, 3 and 4.

FIG. 2 is illustrative of how the chilled or frozen food 1 is thawed by the microwave oven 2 so that it can be served. As can be seen from FIG. 2, while the tray 4-encased bag 3 having the chilled or frozen food 1 packed in it is opened, the food 1 is thawed in the microwave open 2 for about 1 minute (at 500 watts). It is here to be noted that the thawing time varies with the type of the microwave oven 2; when the food 1 remains still cold after heating, it must be reheated at an increment of 10 seconds while watching how it goes.

Once thawing has been over, the tray 4 is flipped over to pass the food 1 over to the dish 5 already in hand. As shown, the food 1 in bread form is dished up at 5.

The food 1 can then be served with the spoon 6 or the like. In this case, sufficient care should be taken of the temperature of the heated food. The food 1 can be easily mashed by the tongue so that it could be easily eaten by those who have difficulty chewing. The food is so damp and soft that even the crump could be eaten with the use of the spoon 6.

FIG. 3 is illustrative of how the food is thawed in the refrigerator 7. First, the food is moved from the freezer to the refrigerator 7 for storage. The food here is thawed while the bag remains unopened. The food must be served within about 24 hours after thawing in the refrigerator 7.

Then, while the bag 3 is opened, the food is heated in the microwave oven 2 for about 20 seconds (at 500 watts). In this case, the bag 3 must necessarily remain opened.

After that, the tray 4 is flipped over to pass the food over to the dish 5 already in hand. As shown, the food in bread form is dished up at 5.

The food can be served with the spoon 6 or the like.

FIG. 4 is illustrative of how the food is thawed at room temperature. As shown in FIG. 4, the food is thawed for 2 hours while the bag remains intact or unopened. The food should be served within about 6 hours after thawing.

After thawing, the food is heated in the microwave oven 2 (at 500 watts) for about 20 seconds, with the bag opened. In this case, the bag must necessarily remain opened.

After that, the tray 4 is flipped over to pass the food over to the dish 5 or the like. In this case, as shown, the food in bread form is dished up at 5.

Then, the food is served with the spoon 6 or the like.

EXAMPLES

The present invention is now explained in more details with reference to inventive and comparative examples by way of example only, but not as limitations.

Example 1

Easy-to-Chew/Swallow Food Making

For instance, 85 parts by mass of wheat flour, 15 parts by mass of starch, 8 parts by mass of sugars, 10 parts by mass of oils and fats, 3 parts by mass of skim milk powder, 2 parts by mass of salt, 3 parts by mass of fresh yeast, 0.2 parts by mass of the viscosity-increasing stabilizer, 0.3 parts by mass of the bread improver and 75 parts by mass of water were charged and mixed together in a mixer for 2 minutes at low speed and for 2 minutes for medium speed.

After that, the mixture was placed in a baking mold, and proofed for 1 hour at a temperature of 38° C. and a relative humidity of 85%.

Then, the mixture was baked for 30 minutes in an oven set at a temperature of 210° C. into a bread-like foodstuff.

After cooling, the foodstuff was sliced to an 18.5 mm thickness as an example, and 100 parts by mass of slices were dipped in, for instance, 100 parts by mass of water to obtain easy-to-chew/swallow foods.

The thus obtained easy-to-chew/swallow foods were measured for hardness on a creep meter physical properties testing system (RE2-3305S made by Yamaden Co., Ltd.).

The hardness here is measured according to the Universal Design Food testing method provided by the Japan Care Food Conference.

The obtained foods were found to have a crumb hardness of $1.25 \times 10^4$ N/m$^2$ and a crust hardness of $1.33 \times 10^4$ N/m$^2$, figures being less than $2 \times 10^4$ N/m$^2$: the "Mashing-by-the-tongue" standard provided in Section 3 of the Universal Design Food.

Example 2

Easy-to-Chew/Swallow Food Making

For instance, 85 parts by mass of wheat flour, 15 parts by mass of starch, 35 parts by mass of sugars, 20 parts by mass of oils and fats, 3 parts by mass of skim milk powder, 1.8 parts by mass of salt, 7 parts by mass of fresh yeast, 0.2 parts by mass of the viscosity-increasing stabilizer, 0.3 parts by mass of the bread improver and 55 parts by mass of water were charged and mixed together in a mixer for 2 minutes at low speed and for 2 minutes for medium speed.

After that, the mixture was placed in a baking mold, and proofed for 1 hour at a temperature of 38° C. and a relative humidity of 85%.

Then, the mixture was baked for 30 minutes in an oven set at a temperature of 210° C. into a bread-like foodstuff.

After cooling, the foodstuff was sliced to an 18.5 mm thickness, and 100 parts by mass of slices were dipped in 100 parts by mass of water to obtain easy-to-chew/swallow foods.

The thus obtained easy-to-chew/swallow foods were measured for hardness on a creep meter physical properties testing system (RE2-3305S made by Yamaden Co., Ltd.). The hardness here is measured according to the Universal Design Food testing method provided by the Japan Care Food Conference.

The obtained foods were found to have a crumb hardness of $2.8 \times 10^4$ N/m$^2$ and a crust hardness of $2.66 \times 10^4$ N/m$^2$, figures being less than $5 \times 10^4$ N/m$^2$: the "Mashed-by-the-gum-and-tongue" standard provided in Section 2 of the Universal Design Food.

Comparative Example 1

Ordinary Pullman Bread Making

Sixty (60) parts by mass of wheat flour, 1 part by mass of fresh yeast, 0.1 part by mass of the bread improver and 34 parts by mass of water were charged and mixed together in a mixer ball for 2 minutes at low speed and for 2 minutes at medium speed, using a hook, to obtain sponge dough.

The kneading temperature was 24° C. This sponge dough was placed in a dough box for a 4-hour sponge fermentation in a constant-temperature chamber having a temperature of 28° C. and a relative humidity of 85%, with a terminating temperature of 29° C. The post-fermentation dough was recharged in the mixer bowl where 40 parts by mass of wheat flour, 1.9 parts by mass of salt, 2 parts by mass of skim milk powder, 5 parts by mass of first-class white sugar and 27 parts by mass of water were further added to, and mixed with, the dough for 3 minutes at low speed and for 3 minutes at medium speed.

Here 5 parts by mass of a kneaded oil and fat combination (margarine having an oil content of 80% by mass) were charged for a 3-minute, low-speed mixing, a 3-minute, medium-speed mixing, and a 1-minute, high-speed mixing using a hook, thereby obtaining general bread dough containing 5 parts by mass of sugars and 4 parts by mass of the oil and fat combination per 100 parts by mass of flour.

The kneading temperature for the obtained bread dough was 28° C. After a flour time of 30 minutes, the dough was divided and rounded to 230 grams. Then, after a bench time of 20 minutes, the dough was molded in a molder, and 6 loafs, each U-shaped, were placed in a 3-loaf Pullman mold where they were proofed for 1 hour at a temperature of 38° C. and a relative humidity of 85%, and then baked for 30 minutes in an oven at a temperature of 210° C. to obtain Pullman bread.

The thus obtained general Pullman bread was measured for hardness on a creep meter physical properties testing system (RE2-3305S made by Yamaden Co., Ltd.). The hardness measurement was carried out according to the Universal Design Food product testing method provided by the Japan Care Food Conference.

The general Pullman bread had a crumb hardness of $1.3 \times 10^5$ N/m$^2$ and a crust hardness of $5.4 \times 10^5$ N/m$^2$, figures being greater than $5 \times 10^4$ N/m$^2$: the "Mashed-by-the-gum-and-tongue" standard provided in Section 2 of the Universal Design Food and meaning that it could hardly be chewed and swallowed with safety and ease by those who have difficulty chewing and swallowing.

As in the inventive examples, 100 parts by mass of ordinary Pullman bread were dipped in 100 parts by mass of water to measure its hardness. That Pullman bread had a crumb hardness of $7.2 \times 10^4$ N/m$^2$ and a crust hardness of $2.5 \times 10^5$ N/m$^2$, those figures being greater than $5 \times 10^4$ N/m$^2$: the "Mashed-by-the-gum-and-tongue" standard provided in Section 2 of the Universal Design Food and meaning that even after subjected to the similar processing, it could hardly be chewed and swallowed with safety and ease by those who have difficulty chewing and swallowing.

As can be appreciated from the results mentioned above, it is found that the inventive food could be chewed and swallowed, while remaining its original (bread) form, by those who have difficulty chewing and swallowing down foods, especially the aged, those who are suffering from diseases, recuperating or getting better, and having aftereffects of diseases, and babies in the weaning period.

EXPLANATION OF THE REFERENCE NUMERALS

1: Chilled or frozen food
2: Microwave oven
3: Bag
4: Tray
5: Dish
6: Spoon
7: Refrigerator

POSSIBLE APPLICATIONS TO THE INDUSTRY

The invention successfully provides a food that can be chewed and swallowed down, while remaining its original (bread) form, by those who have difficulty chewing and swallowing down foods, especially the aged, those who are suffering from diseases, recuperating or getting better, and having aftereffects of diseases, and babies in the weaning period, and a food making method.

If the inventive food is served with an assortment of foods having physical hardness that meets the acceptable standard imposed by the Ministry of Health, Labor and Welfare on foods for those who have difficulty chewing, an assortment of pre-cooked foods, inclusive of universal design foods, served for the age, or an assortment of vegetable purees having moderate viscosity, it is then possible to proffer well-balanced meals to them.

Alternatively, if the inventive food is served with sweetened sauces such as jam, fruit sauce, custard and chocolate sauce, it is then possible to provide an assortment of desserts that can be chewed and swallowed down with safety and ease, contributing to improvements in the quality of life of those who have difficulty chewing and swallowing down foods.

What is claimed is:
1. A method of making bread for a person whose ability to chew and swallow food is reduced, the method comprising:
preparing a bread dough containing 75 parts by mass of water, 35 parts by mass of sugars, 10 parts by mass of a combination of oil and fat, 3 parts by mass of skim milk powder, 2 parts by mass of salt, and 3 parts by mass of fresh yeast, per 100 parts by mass of flour, the flour being 15 parts by mass starch and 85 parts by mass of other wheat flours, wherein the bread dough further contains a viscosity-increasing stabilizer comprising methyl cellulose and/or hydroxypropyl cellulose in an amount of 0.01 to 5 parts by mass per 100 parts by mass of the flour;
swelling the bread dough using at least one ingredient selected from the group consisting of yeast and a swelling agent;
placing the bread dough in a mold and heating the bread dough at a temperature of 210° C. for 30 minutes to obtain a foodstuff;
cooling the foodstuff and slicing the foodstuff to a desired thickness to obtain a sliced foodstuff;
impregnating 50 to 200 parts by mass of liquid, gelatin or agar solution into 100 parts by mass of the sliced foodstuff by dipping the sliced foodstuff into the liquid, gelatin or agar solution to obtain an impregnated foodstuff;
packing the impregnated foodstuff to obtain a packed foodstuff;
chilling or freezing the packed foodstuff for extending storage to obtain a chilled or frozen foodstuff;
warming the chilled or frozen foodstuff for consumption by the person whose ability to chew and swallow foods is reduced to obtain a warmed foodstuff; and
heating the warmed foodstuff to obtain a heated foodstuff, wherein the heated foodstuff has a crumb hardness of $1.25 \times 10^4$ N/m$^2$, measured according to the Universal Design Food testing method provided by the Japan Care Food Conference, and maintains its original form.

* * * * *